United States Patent

[11] 3,584,259

[72] Inventors Norman L. Traub
  Troy;
  Mark E. Preiser, Sterling Heights, both of, Mich.
[21] Appl. No. 15,771
[22] Filed Mar. 2, 1970
[45] Patented June 8, 1971
[73] Assignee General Motors Corporation
  Detroit, Mich.

[54] PHASE FAILURE DETECTION SYSTEM
  4 Claims, 6 Drawing Figs.

[52] U.S. Cl. ................................................. 317/31,
  317/27, 317/33, 317/46, 317/47, 317/36, 307/202
[51] Int. Cl. ......................................................... H02h 3/24
[50] Field of Search ........................................... 317/27, 26,
  31, 33, 46, 47, 36; 307/127, 130, 204, 202, 219;
  328/96

[56] References Cited
UNITED STATES PATENTS
| | | | |
|---|---|---|---|
| 2,393,043 | 1/1946 | Harder | 317/26(X) |
| 3,001,100 | 9/1961 | Schuh | 317/27(X) |
| 3,157,826 | 11/1964 | Norton | 317/46 |
| 3,428,865 | 2/1969 | Opad | 317/46(X) |

Primary Examiner—William M. Shoop, Jr.
Assistant Examiner—Harvey Fendelman
Attorneys—E. W. Christen, C. R. Meland and Albert F. Duke ABSTRACT: A system for detecting single phase operation or total loss of power in a three phase electrical network. In this system, sensing circuits monitor the line-to-line voltages available from a three phase source of electric power. These sensing circuits cooperate with an indicating means to provide an indication upon the occurrence of either a phase failure or a total loss of power. The sensing circuit include monostable multivibrators which are connected across pairs of supply conductors connected with the output of the three phase source. These multivibrators provide output pulses of a predetermined time duration in response to input voltages exceeding a predetermined magnitude and, accordingly, the multivibrators are sequentially and periodically switched in accordance with the voltages provided by the three phase source. Thus, the three multivibrators connecting the various pairs of supply conductors produce time displaced pulses except during those periods when the three phase source ceases its three phase operation. By monitoring the output pulses from the three multivibrators, an indication is derived when the three phase source ceases its three phase operation.

PATENTED JUN 8 1971

INVENTORS
Norman L. Traub, &
Mark E. Preiser
BY
C. R. Meland
ATTORNEY

PATENTED JUN 8 1971 3,584,259

INVENTORS
Norman L. Traub, &
BY Mark E. Preiser

C. R. Meland
ATTORNEY

PHASE FAILURE DETECTION SYSTEM

This invention relates to a system wherein a three phase source of electric power is monitored and an indication is provided when the source ceases to maintain three phase operation.

Under a variety of circumstances, detrimental affects can accompany single phase energization of a three phase load. For example, three phase induction motors can be damaged by the application of single phase power. It is, therefore, desireable to ensure against single phase operation of such three phase loads.

In the past, various systems have been employed for monitoring the voltage levels available from a three phase source. For example, a control signal can be developed by means of full wave rectification of the voltages available from a three phase source. Cessation of three phase operation is accompanied by a detectable variance in the voltage magnitude available from this full wave rectifier. A system of the type just described is disclosed in the patent to Opad 3,242,383.

In contrast to the full wave rectifier approach of detecting single phase operation, the system of this invention utilizes three monostable multivibrators that monitor or sense the three line-to-line voltages and produce pulses in accordance with the various waveforms representing the three line-to-line voltages. During normal operation, the pulses from the multivibrators are time displaced and the outputs from the multivibrators are never all simultaneously at the same voltage level. On the occurrence of a fault causing single phase operation, the multivibrators do provide output pulses simultaneously at the same voltage level, thus indicating single phase operation.

Accordingly, it is an object of the present invention to provide a phase failure detection system wherein the voltage waveforms associated with a three phase source are monitored to ascertain the state of operation of the three phase source and an indication is provided when the source commences single phase operation.

Another object of the present invention is to provide a phase failure detection system wherein an indication of single phase operation is developed in response to single phase operation by distinguishing the periodicity of the waveforms available from the three phase source during single phase operation from that normally associated with three phase operation. In this manner, the phase failure detection system is relatively insensitive to variations in the voltage levels of the voltages available on the supply conductors from the three phase source.

A further object of this invention is to provide a phase failure detection system utilizing monostable multivibrators as set forth above wherein an indication is provided when there is a complete power failure of the three phase source.

Another object of this invention is to provide a phase failure detection system wherein logic gates are employed in monostable multivibrator configurations to produce signals of a predetermined duration in response to the periodically varying voltage waveforms available from the three phase source and further wherein an indicating means is provided which responds to the signals to provide an indication if and only if three phase operation terminates.

additional objects and advantages of this invention will be apparent in light of the following description. The figures listed below are incorporated in the description and illustrate preferred embodiments of the present invention.

Figure 1:
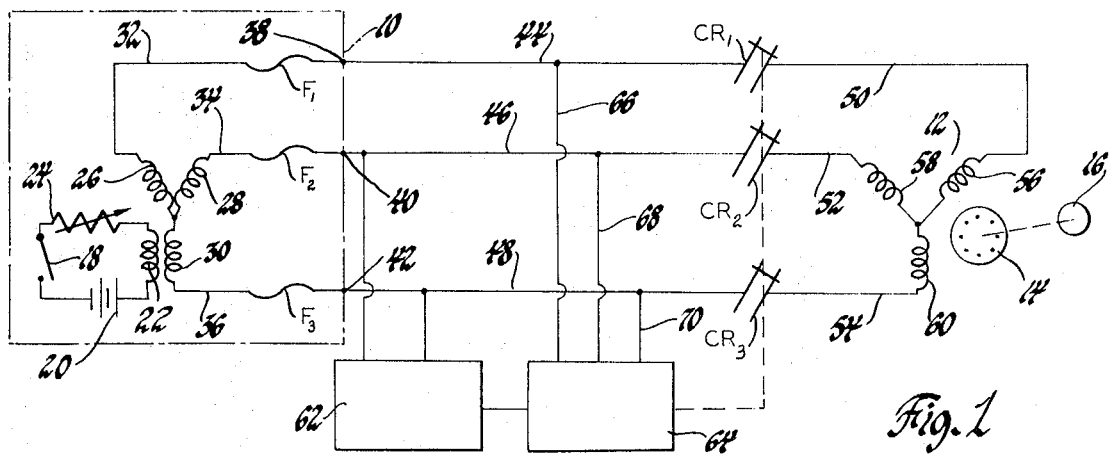
FIG. 1 is a circuit diagram of a three phase AC induction motor system provided with a phase failure detection system made in accordance with this invention.

Referring now to the drawings and more particularly to FIG. 1, an AC induction motor system is depicted with a phase failure detection system for ensuring against single phase operation. In this figure, a three phase constant frequency and constant power source 10 is provided which may be, for example, commercial three phase power delivered to a plant or other facility. For purposes of explanation, this source is illustrated as an alternating current generator which provides energy to drive an induction motor 12 having a rotor 14 connected with a load 16.

The three phase source 10 has an output winding comprised of phase windings 26, 28, and 30 connected in a Y configuration. The field circuit of this three phase source of electric power 10 comprises a switch 18, a battery 20, a field coil 22, and a voltage regulating device which may take various conventional forms but for simplicity is shown as a variable resistor 24. This regulator 24 controls the magnitude of the voltage available from the phase windings 26, 28, and 30 and maintains it substantially constant in a manner known to those skilled in the art.

Three fuses $F_1$, $F_2$, and $F_3$ are included in the output conductors of the power source 10. The three phase windings 26, 28, and 30 are connected with the three fuses through the conductors 32, 34, and 36.

Three phase voltage is available at the output terminals 38, 40, and 42 of the power source 10. Voltage XY is developed across terminals 38 and 40, voltage YZ is developed across terminals 40 and 42, and voltage ZX is developed across terminals 42 and 38. These three terminals 38, 40, and 42 are connected by three conductors 44, 46, and 48, respectively, with one side of three normally closed relay contacts $CR_1$, $CR_2$, and $CR_3$. Three conductors 50, 52, and 54 connect the opposite sides of the three relay contacts with the three phase windings 56, 58, and 60 of the motor 12.

From the above, it follows that the motor is supplied three phase power during those periods in which the three relay contacts are closed and the source of electric power 10 has three phase voltage available at its terminals. Assuming that voltage is available at the source, two circumstances can interrupt power flow between the source and the motor. Either an open circuit resulting from one of the fuses $F_1$, $F_2$, or $F_3$ or an open relay contact will interrupt power flow.

A DC power supply 62 is connected across the supply conductors 46 and 48. Thus, the input to the DC power supply is single phase. This single phase AC is converted to a DC voltage by suitable rectifier means (not Illustrated) for the purpose of providing DC power to the phase failure detection circuit 64 shown in FIG. 1.

The phase failure detection circuit 64, which is described in detail hereinafter, has three input conductors denoted 66, 68, and 70. These three conductors are connected respectively with the power supply conductors 44, 46, and 48. The relay contacts $CR_1$, $CR_2$, and $CR_3$ are controlled by the phase failure detection circuit 64. These contacts remain in their normally closed position until caused to change by a signal from the phase failure detection circuit 64. The contacts open if and only if three phase operation ceases.

Figure 2:
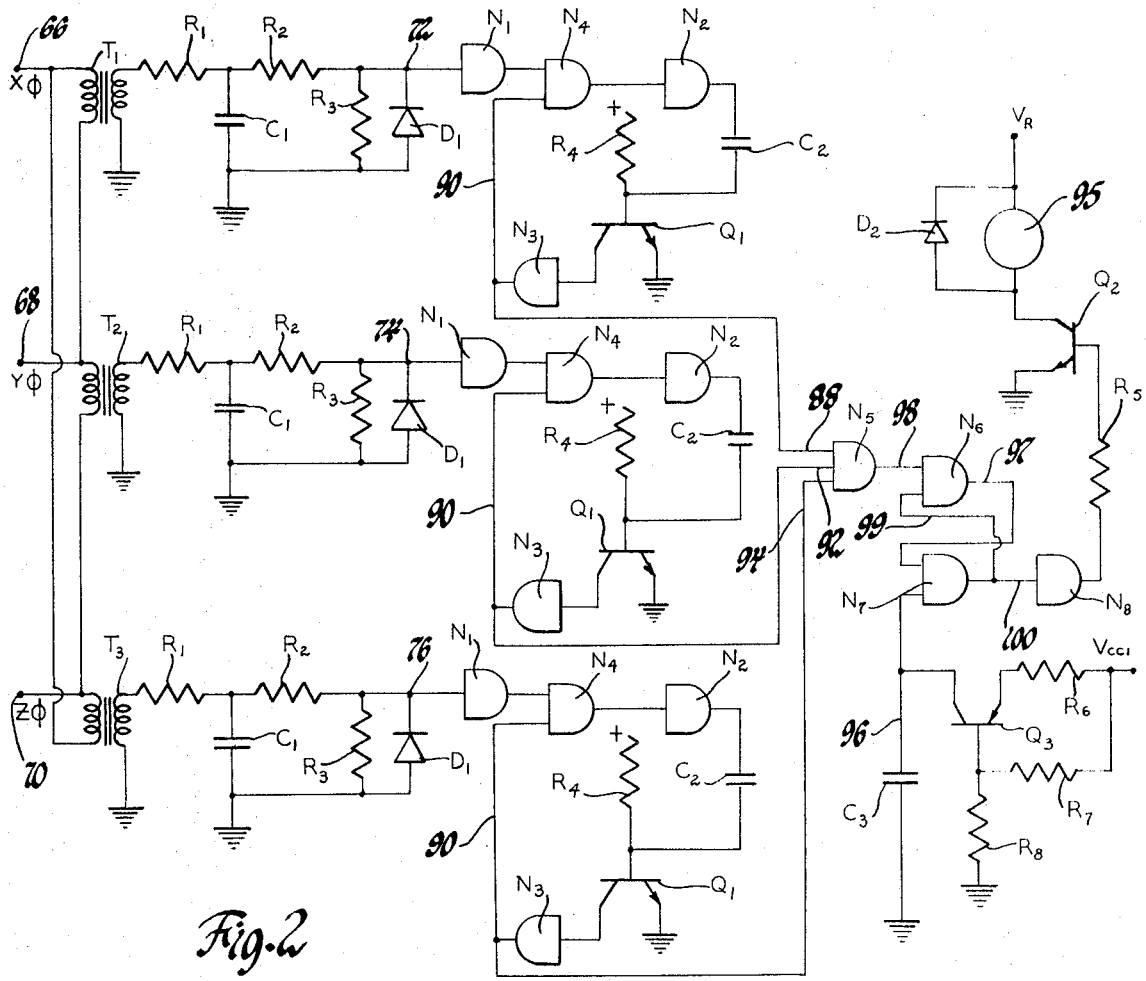
FIG. 2 is a detailed circuit schematic of the phase failure detection network employed in the motor system of FIG. 1.

Referring now to FIG. 2, a detailed circuit schematic of the sensing circuits employed in the phase failure detection circuit 64 of FIG. 1 is set forth. It is seen that the three input conductors 66, 68, and 70 are connected to the primary windings of transformers $T_1$, $T_2$, and $T_3$. These three primary windings are thereby connected with the power supply conductors 44, 46, and 48 of FIG. 1 in a delta connection. Each of the transformers is connected across a pair of the supply conductors 44, 46, and 48. Accordingly, each of the primaries of the transformers $T_1$, $T_2$, and $T_3$ is energized by one of the three line-to-line voltages available from the source of electric power. It is seen that the transformer $T_1$ is energized by the voltage XY, the transformer $T_2$ is energized by the voltage YZ, and the transformer $T_3$ is energized by the voltage ZX.

Each of the secondary windings of the three transformers $T_1$, $T_2$, and $T_3$ is connected with identical circuitry. An RC filter network comprised of a resistor $R_1$ and a capacitor $C_1$ is connected across each secondary winding. A voltage divider comprised of a resistor $R_2$ and a resistor $R_3$ is included in the circuit of each secondary winding. A diode $D_1$ ensures that the juncture of the resistors $R_2$ and $R_3$ does not assume a negative voltage level.

It is noted that in FIG. 2 three identical monostable multivibrator configurations are illustrated. The input terminals of the three monostable multivibrators are denoted 72, 74, and 76. Each of the three monostable multivibrators includes three single input NAND gates $N_1$, $N_2$, and $N_3$ and a two input NAND gate $N_4$, a transistor $Q_1$, a resistor $R_4$, and a capacitor $C_2$.

Each of the NAND gates employed in the phase failure detection system is of a conventional design commercially available and generally known to those skilled in the art. The operation of these gates is characterized by a two level output whose level is dependent on the level of the input voltages. The output is at its high level until and unless each input assumes a voltage in excess of a predetermined value. Thus, a three input NAND gate has a high level output when any one of its inputs, or when any two of its inputs, or when all three of its inputs are supplied voltages less than the requisite predetermined minimum. The output is switched to its low value only when all three of the inputs are supplied voltages in excess of the requisite minimum.

The operation of the monostable multivibrator connected with the transformer $T_1$ will now be described in detail with reference to FIGS. 3 and 4, it being understood that identical operation obtains for each of the three monostable multivibrators. In regard to this description, it is pointed out that FIG. 3 illustrates a multivibrator circuit and FIG. 4 illustrates the voltages at various points in the FIG. 3 circuit.

Figure 3:
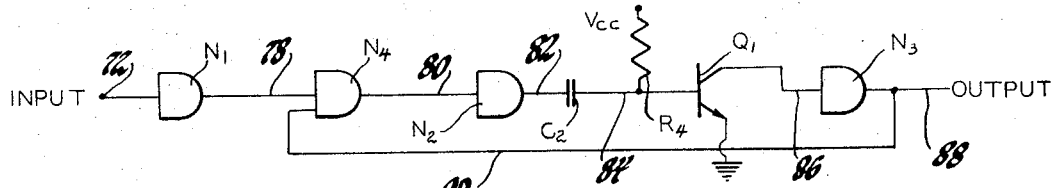
FIG. 3 is a circuit diagram of a single monostable multivibrator which forms a part of the detection system illustrated in FIG. 2.

In FIG. 3, the output of the NAND gate $N_1$ is connected with one of the inputs to the NAND gate $N_4$ by a conductor 78. A conductor 80 connects the output of the NAND gate $N_4$ with the input of the NAND gate $N_2$. One plate of a capacitor $C_2$ is connected with the output of the NAND gate $N_2$ by a conductor 82 and the other plate of the capacitor $C_2$ is connected with the base electrode of the transistor $Q_1$ by a conductor 84. A resistor $R_4$ connects a DC voltage supply $V_{cc}$ to the base electrode of the transistor $Q_1$. The DC voltage $V_{cc}$ is obtained from a DC source which is not illustrated. The emitter of the transistor $Q_1$ is connected with a reference conductor shown as a ground. A conductor 86 connects the collector electrode of the transistor $Q_1$ with the input of the NAND gate $N_3$. The output from the monostable multivibrator is available at the output of the NAND gate $N_3$ on a conductor 88. Feedback is effected by a conductor 90 which connects the input of the NAND gate $N_4$ with the output conductor 88.

Figure 4:
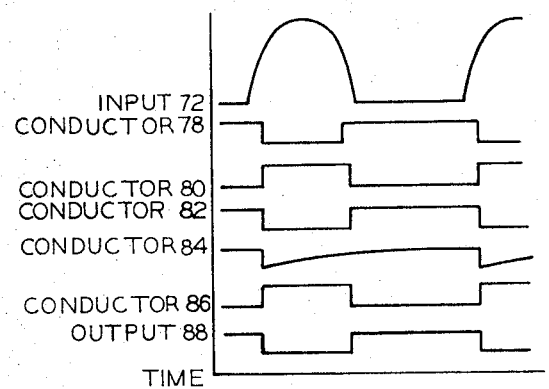
FIG. 4 is a set of characteristic curves illustrating the operation of the monostable multivibrator shown in FIG. 3.

The voltage at the input 72 to the NAND gate $N_1$ is depicted graphically in FIG. 4. This voltage is derived from the line-to-line voltage XY with which the transformer $T_1$ is connected. Line-to-line voltage XY is applied to the primary winding of the transformer $T_1$. The diode $D_1$ shown in FIG. 1 and noted above provides half-wave rectification of the voltage available on the secondary winding of the transformer $T_1$. Additionally, the voltage divider comprised of the resistors $R_2$ and $R_3$ of FIG. 1 and also noted above cause a reduction in the magnitude of the voltage available on the secondary winding of the transformer $T_1$ to a suitable preselected value.

The single input NAND gate $N_1$ functions as an inverter. This NAND gate $N_1$ provides a high level output signal until and unless an input signal exceeding a predetermined voltage level is supplied to it. Accordingly, the voltage graph for the conductor 78 which is connected with the output of $N_1$ shows a high voltage level until the input sinusoid at the input 72 exceeds a predetermined voltage magnitude. NAND gate $N_1$ switches in response to the input voltage and remains at its low output level until the voltage input at input 72 falls below the necessary sustaining value.

The two input NAND gate $N_4$ provides a low output voltage until and unless one and/or the other of its inputs assumes a low level. As shown in the graph of FIG. 4, when the voltage on conductor 78 falls YZ, its low level, to voltage on conductor 80 representing the output of the two input NAND gate $N_4$ assumes its high level. This high level on conductor 80 is sustained until both the inputs to the two input NAND gate $N_4$ have resumed high levels.

The single input NAND gate $N_2$ functions as an inverter. The output of this NAND gate $N_2$ on conductor 82 is the opposite of the input of the NAND gate $N_2$ on conductor 80. Accordingly, as depicted graphically in FIG. 4, its voltage waveshape is the inverse of that shown for conductor 80.

The voltage on conductor 84, as shown in FIG. 4, has an exponentially varying level. This exponential variation derives from the RC charging network comprising the resistor $R_4$ and the capacitor $C_2$.

Transistor $Q_1$ is biased to its conductive mode by voltage available to its base electrode from conductor 84. Accordingly, the transistor is nonconductive only during the period of time of the transient voltage on conductor 84. While the transistor is turned off, the voltage on conductor 86 is at its high level.

The single input NAND gate $N_3$ functions as a voltage inverter. An output is available on conductor 88 only while the input to the NAND gate $N_3$ is at its low level. When the input to $N_3$ on the conductor 86 switches to its high level, the NAND gate $N_3$ switches and the output on conductor 88 falls to its low level. This output from conductor 88 is coupled to the two input NAND gate $N_4$ by conductor 90. The low voltage on conductor 88 is, therefore, maintained until the transistor resumes its on condition when the RC network attains steady state. This time increment is determined by the time constant of the RC charging network which depends on the values of the resistor $R_4$ and the capacitor $C_2$.

Thus, it is seen that a low level output is available on conductor 88 for a predetermined time duration when an input signal exceeding a predetermined voltage level is applied.

As noted above, each of the three monostable multivibrators depicted in FIG. 2 operates in a manner identical with the operation of the FIG. 3 example. Since the input voltages to the three multivibrators are time displaced, the respective low level output pulses associated therewith are likewise time displaced. Hence, the three sensing circuits provide time displaced output pulses.

Figure 5:
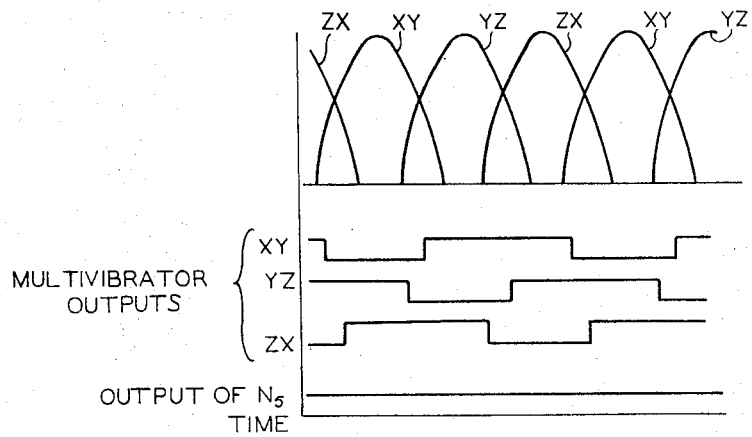
FIG. 5 is a set of curves illustrating the operation of the phase failure detection system of FIG. 2 during a period of normal operation.
Figure 6:
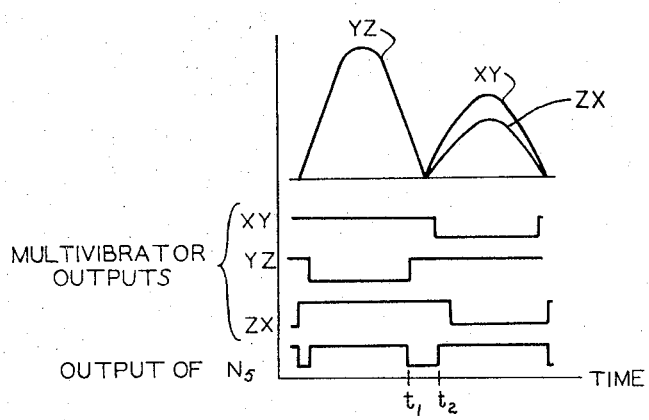
FIG. 6 is a set of curves illustrating the operation of the phase failure detection system of FIG. 2 during a period of single phase operation.

The combined operation of the three monostable multivibrators of FIG. 2 is set forth in FIGS. 5 and 6. The half wave rectified sinusoids associated with normal three phase operation are depicted in FIG. 5. The various waveforms are denoted XY, YZ, and ZX to correlate them with the three line-to-line voltages available from the three phase source. The outputs of the three monostable multivibrators are depicted in FIG. 5 and they are also labeled XY, YZ, and ZX to correlate them with their respective line-to-line voltages. Multivibrator output XY corresponds to the voltage on conductor 88 shown in FIG. 4. It is seen that the low level output pulses developed by the three monostables connected with the various phases are, as noted above, time displaced. It is noted that at no time do all three monostable multivibrators simultaneously provide high level outputs when the system is operating normally.

FIG. 6 depicts the operation when the system is single phasing. In FIG. 6, it is assumed that the fuse $F_1$ has opened to cause this mode of operation. Accordingly, the single phase available from the source 10 of FIG. 1 is phase YZ. The signals obtained from the three pairs of supply conductors are depicted graphically in FIG. 6. They are voltage YZ which is the single phase available and voltages XY and ZX which are related to the YZ voltage. It is noted that the sum of voltages XY and ZX is equal in magnitude to and 180° time displaced from the voltage YZ. This relationship follows since the voltages XY and ZX are developed across the phase windings 58 and 60 which are supplied the single phase voltage YZ. The two phase windings comprise a voltage divider with the voltage YZ being the voltage applied to the voltage divider and the voltages XY and ZX being the voltages across the two components of the voltage divider.

In FIG. 6, the outputs of the three multivibrators are shown during single phase operation. The output of the multivibrator YZ is not altered from that associated with normal three phase operation. However, the outputs from the multivibrators monitoring the line-to-line voltages XY and ZX differ from those in FIG. 5 as a result of the modified voltage waveforms of voltages XY and ZX. The multivibrators operate in the manner described above and, accordingly, their outputs are related to the inputs available. Accordingly, there is an overlap time interval during which all three multivibrator outputs provide a high level, for example, the time interval $t_1$ to $t_2$ shown in FIG. 6.

Referring again to FIG. 2, it is noted that the three outputs 88, 92, and 94 of the three monostable multivibrators are fed to a detecting means comprising a single three input NAND gate $N_5$. This NAND gate $N_5$ provides a high level output until and unless all three of the inputs are supplied voltage signals in excess of a predetermined minimum voltage level. Accordingly, as shown in FIG. 5, during normal operation, the output of the NAND gate $N_5$ is maintained constant at its high level. By contrast and as illustrated in FIG. 6, when the voltage source commences single phase operation, the output of the NAND gate $N_5$ is periodically interrupted. In this manner, single phase operation is detected since the output from the NAND gate $N_5$ periodically assumes its low level.

The relay coil 95 of FIG. 2 controls contacts $CR_1$, $CR_2$, and $CR_3$ and, therefore, provides an indication of single phase operation by opening these three relay contacts $CR_1$, $CR_2$, and $CR_3$ in the supply conductors of the motor system of FIG. 1 when single phase operation occurs. During normal operation of the three phase source, no signal is provided the relay coil and the contacts remain in their normal closed position. On the occurrence of phase failure, the relay 95 is energized by a voltage source $V_R$ (not shown) through transistor $Q_2$ and the contacts switch to their open position. The state of transistor $Q_2$ is controlled by circuitry described hereinafter.

The two input NAND gates $N_6$ and $N_7$ and the single input NAND gate $N_8$ cooperate with a resistor $R_5$ and a transistor $Q_2$ in the control of the relay coil 95. The diode $D_2$ provides a shunt path with the relay 95. A time delay is effected by the coaction of a transistor $Q_3$, a capacitor $C_3$ and the resistors $R_6$, $R_7$, and $R_8$.

The time delay network noted above introduces a delay in the application of a high voltage level on conductor 96 to ensure against false relay trippings which could accompany the initial period of operation. When the motor system of FIG. 1 is initially energized, this time delay causes a delay of a predetermined duration in the operation of the phase failure detection circuit. The DC voltage source 62 supplies the potential $V_{cc1}$ necessary to energize the transistor $Q_3$. When the voltage $V_{cc1}$ is initially applied, the capacitor $C_3$ is uncharged and the voltage on conductor 96 is effectively at ground. Upon the application of voltage $V_{cc1}$ the bias network comprising resistor $R_7$ and $R_8$ provides a bias to the base Electrode of the transistor $Q_3$. The resistor $R_6$ connects the collector electrode of the transistor $Q_3$ with the source of DC voltage $V_{cc1}$. Accordingly, the transistor $Q_3$ is biased to saturation and the capacitor $C_3$ commences charging with a time constant determined by the resistance $R_6$ combined with the emitter-collector resistance of the transistor $Q_3$. After a predetermined time lapse, the voltage on conductor 96 assumes a voltage magnitude sufficient to provide a high level input to the NAND gate $N_7$. This high voltage level is maintained throughout the operating period and terminates only when the system is deenergized. Thus, it is seen that this time delay affords a delay upon the initial energization and is of no consequence to the operation of the phase failure detection circuit thereafter.

In operation, the two input NAND gates $N_6$ and $N_7$ provide a switch function with a memory. The output from this switch is available on conductor 100. This output is at a high level until and unless both inputs to the NAND gate $N_7$ assume high levels. As explained above, the input to the gate $N_7$ from the conductor 96 is at its high level except for a short period following the initial energization of the system. The output from the gate $N_7$ available on the conductor 100 is initially at its high level. This output is connected by the conductor 99 with an input to the gate $N_6$. Thus, it is seen that the output from gate $N_6$ on the conductor 97 remains at its low level until and unless the signal on the conductor 98 assumes a low level. When the signal on the conductor 98 switches to its low level, the output from the gate $N_6$ will switch to its high level. This output is connected through the conductor 97 with one of the inputs to the gate $N_7$. Hence, the output from the gate $N_7$ switches to its low level when the signal on the conductor 98 assumes a low level. The conductor 99 connects this low level with the input to the gate $N_6$ thus ensuring a continued high level output from the gate $N_6$. Accordingly, the signal available on conductor 100 is determined by the output available from the NAND gate $N_5$ on the conductor 98. When the voltage available on conductor 98 assumes a low level, it causes the voltage available on the conductor 100 to assume a low level. As a result of the memory function, the voltage on conductor 100 will remain at its low level until the system is deenergized.

When the voltage available on the conductor 100 assumes a low level, it causes the single input NAND gate $N_8$ to have an output voltage at its high level. This follows since the NAND gate $N_8$ functions as an inverter providing a high level output when supplied a low level input. The output voltage available from the NAND gate $N_8$ is coupled to the base electrode of the transistor $Q_2$ through the resistor $R_5$. In this manner, transistor $Q_2$ is switched on in response to single phase operation of the three phase source. When the transistor $Q_2$ is rendered conductive, the relay 95 is energized by the source $V_R$ and the relay contacts $CR_1$, $CR_2$, and $CR_3$ open.

It is noted that the voltage source 62 in FIG. 1 includes a conventional filter capacitor (not shown) which stores sufficient energy to enable the voltage source 62 to supply a DC voltage of sufficient duration for the system to respond to single phase operation even if one of both of the fuses $F_2$ or $F_3$ in FIG. 1 is opened. The relay 95 in FIG. 2 is a mechanically latching relay and, accordingly, remains actuated once energized in response to the sensing circuits. Voltage source $V_R$ in FIG. 2 also includes a conventional filter capacitor (not shown) which stores sufficient energy to enable the voltage source $V_R$ to supply a DC voltage of sufficient duration for the system to respond to single phase operation and, accordingly, the relay 95 is provided voltage from the source $V_R$ regardless of the state of the three phase system.

In view of the foregoing, it is seen that three sensing circuits including three monostable multivibrators are provided which switch sequentially and periodically in accordance with the three line-to-line voltages associated with a three phase source of electric power. During periods of normal operation, the outputs of the three multivibrators never assume high values simultaneously. When the three phase source commences single phase operation upon the opening of a fuse or in the event of some other failure, the three multivibrators sensing the voltage waveforms provide concurrent high level outputs during limited time intervals. The NAND gate $N_5$ which senses the three outputs provides contrasting output signals during normal and single phase operation. As shown in FIG. 5, the output of the NAND gate $N_5$ is constant at a high level during normal operation; but, during single phase operation, the output of the NAND gate $N_5$ periodically assumes a low level as shown in FIG. 6. The switch comprised of the NAND gates $N_6$ and $N_7$ responds to the low level output from the NAND gate $N_5$ by causing the NAND gate $N_8$ to apply a bias signal to the transistor $Q_2$. When the transistor $Q_2$ is biased conductive by this bias signal from the gate $N_8$, the relay coil 95 is energized and mechanically latched and the contacts $CR_1$, $CR_2$, and $CR_3$ are opened.

In the event the three phase source, after a period of normal operation, ceases operation entirely, the phase failure detection system of this invention will respond by causing the relay contacts $CR_1$, $CR_2$, and $CR_3$ to open. Upon the occurrence of this total loss of power, no voltage is available on any of the conductors 44, 46, and 48 of FIG. 1. Accordingly, the inputs to the three monostable multivibrators will all be zero. As shown in the graph of FIG. 4, the output of the multivibrators is at a high level until switched by an input signal to a low level. Under conditions of total power failure, no input signal is provided any of the three multivibrators and, accordingly, each maintains a continuous constant high level output. As noted above in the explanation directed to detection of single phase operation, the NAND gate $N_5$ responds to three simultaneous high level inputs from the multivibrators. In the situation where there has been a total loss of power, the response of the NAND gate $N_5$ causes the relay 95 of FIG. 2 to open the relay contacts in a manner identical with that described above for detection of single phase operation.

Thus, it is seen that the phase failure detection system of this invention responds to a failure of one, two, or all three phases of a three phase system by opening relay contacts provided in the supply conductors. The various DC power supplies which provide energy for the operation of the detection system include conventional filter capacitors which store sufficient energy to supply a DC voltage of sufficient duration for the system to respond even if the input voltage to the power supplies is interrupted by the system malfunction to be detected. Once the system responds, there is no further need for electric power since the relay which is actuated has a mechanical latching means which maintains the relay's contacts in their open position until manually reset.

We claim:

1. A phase failure detection system for detecting phase failure in a polyphase power supply system, comprising: a polyphase source of alternating current connected with a plurality of power supply conductors; a plurality of sensing circuits, each of said sensing circuits including a switching means capable of providing a pulsating output signal comprised of a series of substantially rectangular pulses in response to a sinusoidal input signal; means connecting each of said sensing circuits across a different pair of said supply conductors whereby, the line-to-line voltages available on said supply conductors are simultaneously monitored by said sensing circuits and said sensing circuits are sequentially switched in accordance with the periodic waveforms of the line-to-line voltages, the substantially rectangular output signals of said sensing circuits having a first predetermined phase relationship when said system provides normal polyphase operation and a different predetermined phase relationship when a phase failure occurs; detection means connected with the outputs of said sensing circuits for simultaneously monitoring the outputs of all of said sensing circuits, said detection means including a switching means responsive to the phase relationship of said sensing circuit output signals and providing an output signal when said sensing circuit output signals have said different predetermined phase relationship; and indicating means connected with the output of said detection means for providing an indication in response to a phase failure.

2. A phase failure detection system for detecting phase failure in a three phase power supply, comprising: a three phase source of electric power having three output terminals; three supply conductors connected respectively with said output terminals; a transformer having three primary windings and three secondary windings; means connecting said primary windings in a delta-connection with said supply conductors; three gate means, each of said gate means capable of providing a pulsating output signal having pulses of predetermined duration in response to a sinusoidal input signal; means connecting each of said gate means with a different one of said secondary windings whereby, the line-to-line voltages available on said supply conductors sequentially enable each of said gate means in accordance with the periodic waveform of the respective line-to-line voltage coupled to the input of the gate means, the pulsating output signals of said gate means having a first predetermined phase relationship when said system provides normal three phase operation and a different predetermined phase relationship when a phase failure occurs; detection means connected with the outputs of said gate means for simultaneously monitoring the outputs of all three of said gate means, said detection means including a switching means responsive to the phase relationship of said gate means output signals and providing an output signal when said gate means output signals have said different predetermined phase relationship; and indicating means connected with the output of said detection means for providing an indication in response to a phase failure.

3. A phase failure detection system for detecting phase failure in a three phase power supply, comprising: a three phase source of electric power having three output terminals; three supply conductors connected respectively with said output terminals; a transformer having three primary windings and three secondary windings; means connecting said primary windings in a delta connection with said supply conductors; three gate means, each of said gate means capable of providing a pulsating output signal comprised of a series of rectangular pulses of predetermined pulse width in response to a sinusoidal input signal; means connecting each of said gate means with a different one of said secondary windings whereby, the line-to-line voltages available on said supply conductors sequentially switch each of said gate means and said gate means provide said time displaced rectangular output pulses in accordance with the periodic waveforms of the respective line-to-line voltages coupled to the inputs of the gate means, the pulsating output signals of said gate means having a first predetermined phase relationship when said system provides normal three phase operation and a different predetermined phase relationship when a phase failure occurs; detection means connected with the outputs of said gate means for simultaneously monitoring the outputs of all three of said gate means, said detection means including a switching means responsive to the phase relationship of said gate means output signals and providing an output signal if said gate means output signals have said different predetermined phase relationship; and indicating means connected with the output of said detection means for providing an indication in response to a phase failure.

4. A phase failure detection system for monitoring a three phase power supply and for providing an indication if the source fails to maintain three phase operation, comprising: a three phase source of electric power having three output terminals; three supply conductors connected respectively with said output terminals; a transformer having three primary windings and three secondary windings; means connecting said primary windings in a delta connection with said supply conductors; three gate means, each of said gate means capable of providing a pulsating output signal comprised of a series of rectangular pulses of predetermined pulse width in response to a sinusoidal input signal; means connecting each of said gate means with a different one of said secondary windings whereby, the line-to-line voltages available on said supply conductors sequentially switch each of said gate means and said gate means provide said time displaced rectangular output pulses in accordance with the periodic waveforms of the respective line-to-line voltages coupled to the inputs of the gate means, the pulsating output signals of said gate means having a first predetermined phase relationship when said system provides normal three phase operation and a different predetermined phase relationship when a phase failure occurs; each of said gate means providing a constant continuous output of like polarity in the absence of input signals from said secondary windings; detection means connected with the outputs of said gate means for simultaneously monitoring the outputs of all three of said gate means, said detection means including a switching means responsive to the output signals provided by said gate means and providing an output signal if said gate means output signals have either said different predetermined phase relationship to indicate single phase operation or said constant continuous output to indicate total loss of power; and indicating means connected with the output of said detection means for providing an indication in response to single phase operation or a total loss of power.